(12) United States Patent
Akkarakaran et al.

(10) Patent No.: US 12,302,145 B2
(45) Date of Patent: May 13, 2025

(54) LOCATION ASSISTANCE DATA FOR WIDEBAND POSITIONING

(71) Applicant: QUALCOMM Incorporated, San Diego, CA (US)

(72) Inventors: Sony Akkarakaran, Poway, CA (US); Tao Luo, San Diego, CA (US); Jingchao Bao, San Diego, CA (US); Alexandros Manolakos, Escondido, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 18/364,381

(22) Filed: Aug. 2, 2023

(65) Prior Publication Data

US 2023/0379736 A1    Nov. 23, 2023

Related U.S. Application Data

(62) Division of application No. 17/338,504, filed on Jun. 3, 2021, now Pat. No. 11,792,666.
(Continued)

(51) Int. Cl.
*H04W 64/00*    (2009.01)
*G01S 3/38*    (2006.01)
(Continued)

(52) U.S. Cl.
CPC .............. *H04W 24/08* (2013.01); *G01S 3/38* (2013.01); *H04B 7/0617* (2013.01); *H04L 5/0048* (2013.01)

(58) Field of Classification Search
CPC ... H04W 24/08; H04W 64/006; H04W 64/00; G01S 3/38; G01S 5/02; G01S 1/0428;
(Continued)

(56) References Cited

U.S. PATENT DOCUMENTS

| | | | |
|---|---|---|---|
| 2009/0040123 A1 | 2/2009 | Hur et al. | |
| 2013/0002488 A1 | 1/2013 | Wang et al. | |

(Continued)

FOREIGN PATENT DOCUMENTS

| | | |
|---|---|---|
| CN | 110547004 A | 12/2019 |
| EP | 3860192 A1 | 8/2021 |

(Continued)

OTHER PUBLICATIONS

Taiwan Search Report—TW110120478—TIPO—Sep. 29, 2024.
(Continued)

*Primary Examiner* — Kenneth T Lam
(74) *Attorney, Agent, or Firm* — Weaver Austin Villeneuve & Sampson LLP/QUALCOMM

(57) ABSTRACT

Frequency-dependent changes in beam shapes of transmitted RF signals can be provided to a receiving device. Beam shape information can include, for example, gain of a beam and a plurality of azimuth and elevation directions, boresight and width of a main lobe (and optionally side lobes) of the beam, information regarding a pattern of antenna elements of an antenna panel used to transmit the beam, and/or similar information. The type of information provided can dictate the amount of overhead required, and we therefore vary depending on the means by which the information is conveyed. Additional detail is provided in the embodiments described herein.

27 Claims, 9 Drawing Sheets

Related U.S. Application Data

(60) Provisional application No. 63/034,841, filed on Jun. 4, 2020.

(51) Int. Cl.
*H04B 7/06* (2006.01)
*H04L 5/00* (2006.01)
*H04W 24/08* (2009.01)

(58) Field of Classification Search
CPC ....... G01S 1/08; G01S 5/0236; H04B 7/0617; H04B 7/0695; H04L 5/0048; H04L 5/0023
See application file for complete search history.

(56) References Cited

U.S. PATENT DOCUMENTS

| | | | |
|---|---|---|---|
| 2015/0326289 | A1 | 11/2015 | Kim et al. |
| 2016/0191176 | A1 | 6/2016 | O'Keeffe et al. |
| 2016/0191201 | A1 | 6/2016 | Park et al. |
| 2017/0142682 | A1 | 5/2017 | Gunnarsson et al. |
| 2017/0339516 | A1 | 11/2017 | Edge et al. |
| 2017/0353210 | A1* | 12/2017 | Pratt ............... H04B 7/0617 |
| 2017/0374637 | A1* | 12/2017 | Akkarakaran ........ H04L 5/0051 |
| 2018/0026356 | A1 | 1/2018 | Schmalenberg et al. |
| 2019/0044677 | A1 | 2/2019 | Ly |
| 2019/0053071 | A1 | 2/2019 | Ly |
| 2019/0123864 | A1 | 4/2019 | Zhang et al. |
| 2019/0260485 | A1 | 8/2019 | Byun et al. |
| 2019/0369201 | A1 | 12/2019 | Akkarakaran et al. |
| 2020/0137714 | A1 | 4/2020 | Kumar et al. |
| 2020/0145078 | A1 | 5/2020 | Hong et al. |
| 2020/0145977 | A1 | 5/2020 | Kumar et al. |
| 2021/0144716 | A1 | 5/2021 | Choi et al. |
| 2021/0328747 | A1* | 10/2021 | Da ................... H04L 5/0058 |
| 2021/0329417 | A1 | 10/2021 | Priyanto et al. |
| 2021/0385678 | A1 | 12/2021 | Akkarakaran et al. |
| 2022/0022182 | A1 | 1/2022 | Michalopoulos |
| 2022/0026517 | A1* | 1/2022 | Hasegawa ............... G01S 7/003 |
| 2022/0190487 | A1 | 6/2022 | Sun et al. |

FOREIGN PATENT DOCUMENTS

| | | | |
|---|---|---|---|
| JP | 2019140512 | A | 8/2019 |
| TW | 201830887 | A | 8/2018 |
| TW | 202005308 | A | 1/2020 |
| WO | 2016013446 | A1 | 1/2016 |
| WO | 2019054908 | A1 | 3/2019 |
| WO | 2019079500 | A1 | 4/2019 |
| WO | 2020066103 | A1 | 4/2020 |
| WO | WO 2020063286 | A1 | 4/2020 |
| WO | WO 2020087441 | A1 | 5/2020 |

OTHER PUBLICATIONS

International Preliminary Report on Patentability—PCT/US2021/035837 the International Bureau of WIPO—Geneva, Switzerland, Dec. 15, 2022.

International Search Report and Written Opinion—PCT/US2021/035837—ISA/EPO—Sep. 9, 2021.

Qualcomm Incorporated: "Initial Thoughts on Potential Positioning Enhancements", 3GPP Draft, 3GPP TSG RAN WG1 #101-e, R1-2004492, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, May 16, 2020 (May 16, 2020), XP051886221, pp. 1-14, Sections 1-7, p. 13, Line 7-Line 27, p. 10, sections 4.1, 5.1-5.2, 6-1.

Qualcomm Incorporated: "Summary of [108#89] [NR/Pos] UE-Based Downlink Positioning Assistance Data", 3GPP Draft, 3GPP TSG-RAN WG2 Meeting #109, R2-2001234, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 24, 2020-Feb. 28, 2020 Feb. 14, 2020 (Feb. 14, 2020), XP051849552, pp. 1-38.

* cited by examiner

LOCATION ASSISTANCE DATA FOR WIDEBAND POSITIONING

RELATED APPLICATIONS

This application is a divisional of U.S. application Ser. No. 17/338,504, filed Jun. 3, 2021, entitled "LOCATION ASSISTANCE DATA FOR WIDEBAND POSITIONING", which claims the benefit of U.S. Provisional Application No. 63/034,841, filed Jun. 4, 2020, entitled "LOCATION ASSISTANCE DATA FOR WIDEBAND POSITIONING", both of which are assigned to the assignee hereof, and incorporated by reference herein in their entirety.

BACKGROUND

1. Field of Disclosure

The present disclosure relates generally to the field of wireless communications, and more specifically to determining the location of a User Equipment (UE) using radio frequency (RF) signals.

2. Description of Related Art

In a data communication network, various positioning techniques can be used to determine the location of a mobile electronic device (referred to herein as a UE). Some of these positioning techniques may involve determining angular information of beams used by the UE and/or Transmission Reception Points (TRPs) to transmit one or more RF signals. For example, a UE can use beam shape information of an RF signal transmitted by one or more TRPs to determine one or more Angles of Departure (AoD). These measurements, together with information regarding the location of the one or more TRPs can be used to determine a location of the UE.

BRIEF SUMMARY

Embodiments provided herein account for frequency-dependent changes in beam shapes of transmitted RF signals (also referred to herein as "Tx beams") by providing information indicative of a beam shape to a receiving device. Beam shape information can include, for example, gain of a beam and a plurality of azimuth and elevation directions, boresight and width of a main lobe (and optionally side lobes) of the beam, information regarding a pattern of antenna elements of an antenna panel used to transmit the beam, and/or similar information. The type of information provided can dictate the amount of overhead required, and we therefore vary depending on the means by which the information is conveyed. Additional detail is provided in the embodiments described herein.

An example method at a transmitting device, of indicating beam-related information for positioning of a user equipment (UE) in a wireless wideband system, according to this disclosure, comprises receiving an indication of a planned beam measurement of a radio frequency (RF) reference signal for the positioning of the UE. The method also comprises transmitting the RF reference signal. The method also comprises sending, to either or both of a positioning entity or a receiving device, information indicative of a shape of a beam used in transmitting the RF reference signal, wherein the shape of the beam is frequency dependent.

An example method, at a positioning entity, for positioning of a user equipment (UE) in a wireless wideband system, according to this disclosure, comprises obtaining beam measurement information of a radio frequency (RF) reference signal transmitted by a transmitting device. The method also comprises receiving, from the transmitting device, information indicative of a shape of a beam used by the transmitting device to transmit the RF reference signal, wherein the shape of the beam is frequency dependent. The method also comprises determining a position of the UE based on the beam measurement information and the information indicative of the shape of the beam.

An example transmitting device for indicating beam-related information for positioning of a user equipment (UE) in a wireless wideband system, according to this disclosure, comprises a transceiver, a memory, one or more processors communicatively coupled with the transceiver and the memory, wherein the one or more processors are configured to receive an indication of a planned beam measurement of a radio frequency (RF) reference signal for the positioning of the UE. The one or more processing units are further configured to transmit, via the transceiver, the RF reference signal. The one or more processing units are further configured to send, to either or both of a positioning entity or a receiving device, information indicative of a shape of a beam used in transmitting the RF reference signal, wherein the shape of the beam is frequency dependent.

An example positioning entity for positioning of a user equipment (UE) in a wireless wideband system, according to this disclosure, comprises a transceiver, a memory, one or more processors communicatively coupled with the transceiver and the memory, wherein the one or more processors are configured to obtain beam measurement information of a radio frequency (RF) reference signal transmitted by a transmitting device. The one or more processing units are further configured to receive, from the transmitting device via the transceiver, information indicative of a shape of a beam used by the transmitting device to transmit the RF reference signal, wherein the shape of the beam is frequency dependent. The one or more processing units are further configured to determine a position of the UE based on the beam measurement information and the information indicative of the shape of the beam.

An example apparatus for indicating beam-related information for positioning of a user equipment (UE) in a wireless wideband system, according to this disclosure, comprises means for receiving an indication of a planned beam measurement of a radio frequency (RF) reference signal for the positioning of the UE. The apparatus further comprises means for transmitting the RF reference signal. The apparatus further comprises means for sending, to either or both of a positioning entity or a receiving device, information indicative of a shape of a beam used in transmitting the RF reference signal, wherein the shape of the beam is frequency dependent.

An example apparatus for positioning of a user equipment (UE) in a wireless wideband system, according to this disclosure, comprises means for obtaining beam measurement information of a radio frequency (RF) reference signal transmitted by a transmitting device. The apparatus further comprises means for receiving, from the transmitting device, information indicative of a shape of a beam used by the transmitting device to transmit the RF reference signal, wherein the shape of the beam is frequency dependent. The apparatus further comprises means for determining a position of the UE based on the beam measurement information and the information indicative of the shape of the beam.

According to this disclosure, an example non-transitory computer-readable medium stores instructions for indicating beam-related information for positioning of a user equipment (UE) in a wireless wideband system, the instructions comprising code for receiving an indication of a planned beam measurement of a radio frequency (RF) reference signal for the positioning of the UE. The instructions further comprise code for transmitting the RF reference signal. The instructions further comprise code for sending, to either or both of a positioning entity or a receiving device, information indicative of a shape of a beam used in transmitting the RF reference signal, wherein the shape of the beam is frequency dependent.

According to this disclosure, another example non-transitory computer-readable medium stores instructions for positioning of a user equipment (UE) in a wireless wideband system, the instructions comprising code for obtaining beam measurement information of a radio frequency (RF) reference signal transmitted by a transmitting device. The instructions further comprise code for receiving, from the transmitting device, information indicative of a shape of a beam used by the transmitting device to transmit the RF reference signal, wherein the shape of the beam is frequency dependent. The instructions further comprise code for determining a position of the UE based on the beam measurement information and the information indicative of the shape of the beam.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
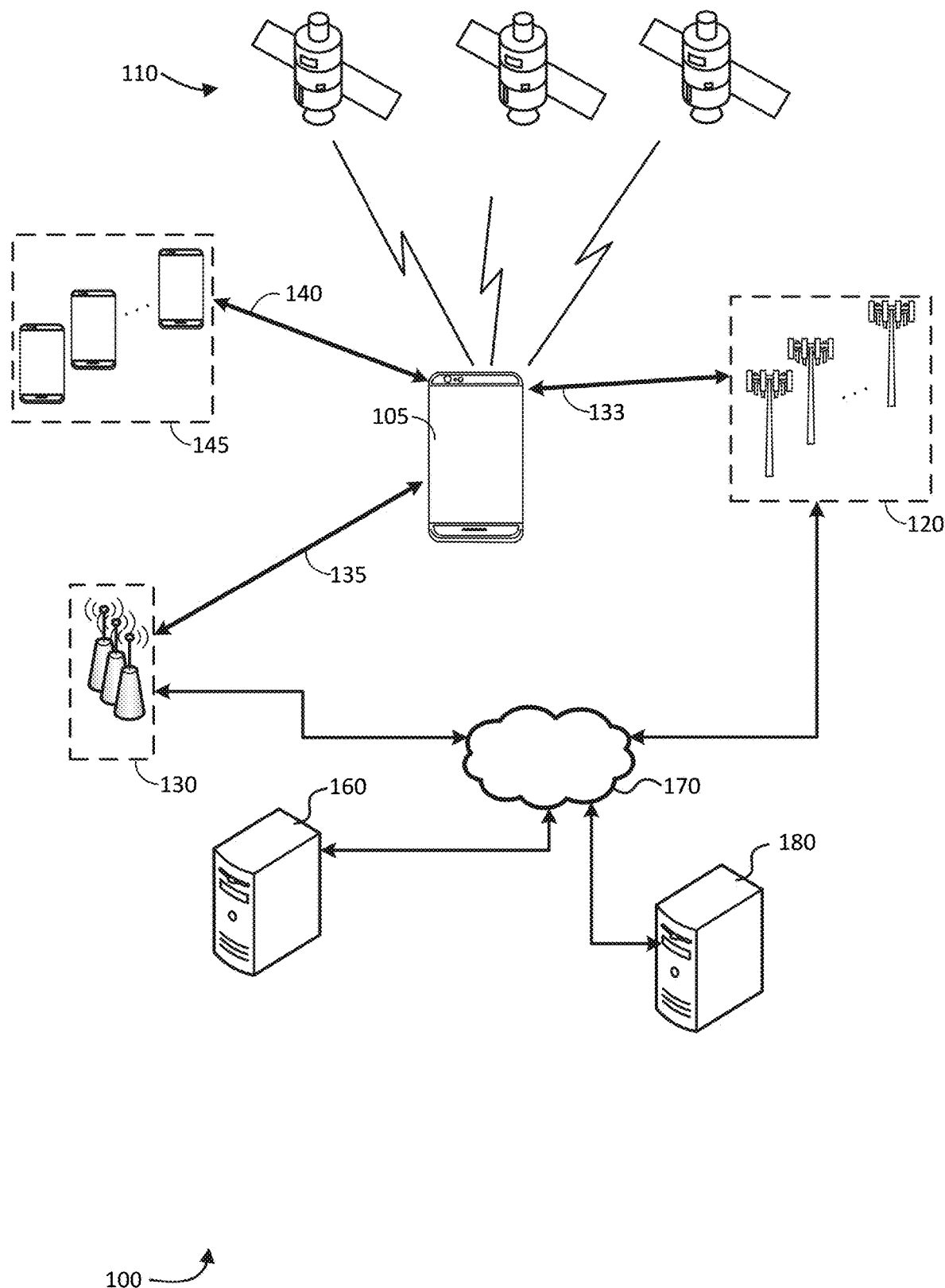
FIG. 1 is a simplified illustration of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 is a simplified illustration of a positioning system 100 in which a UE 105, location server 160, and/or other components of the positioning system 100 can use the techniques provided herein for determining and estimated location of UE 105, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

Figure 2:
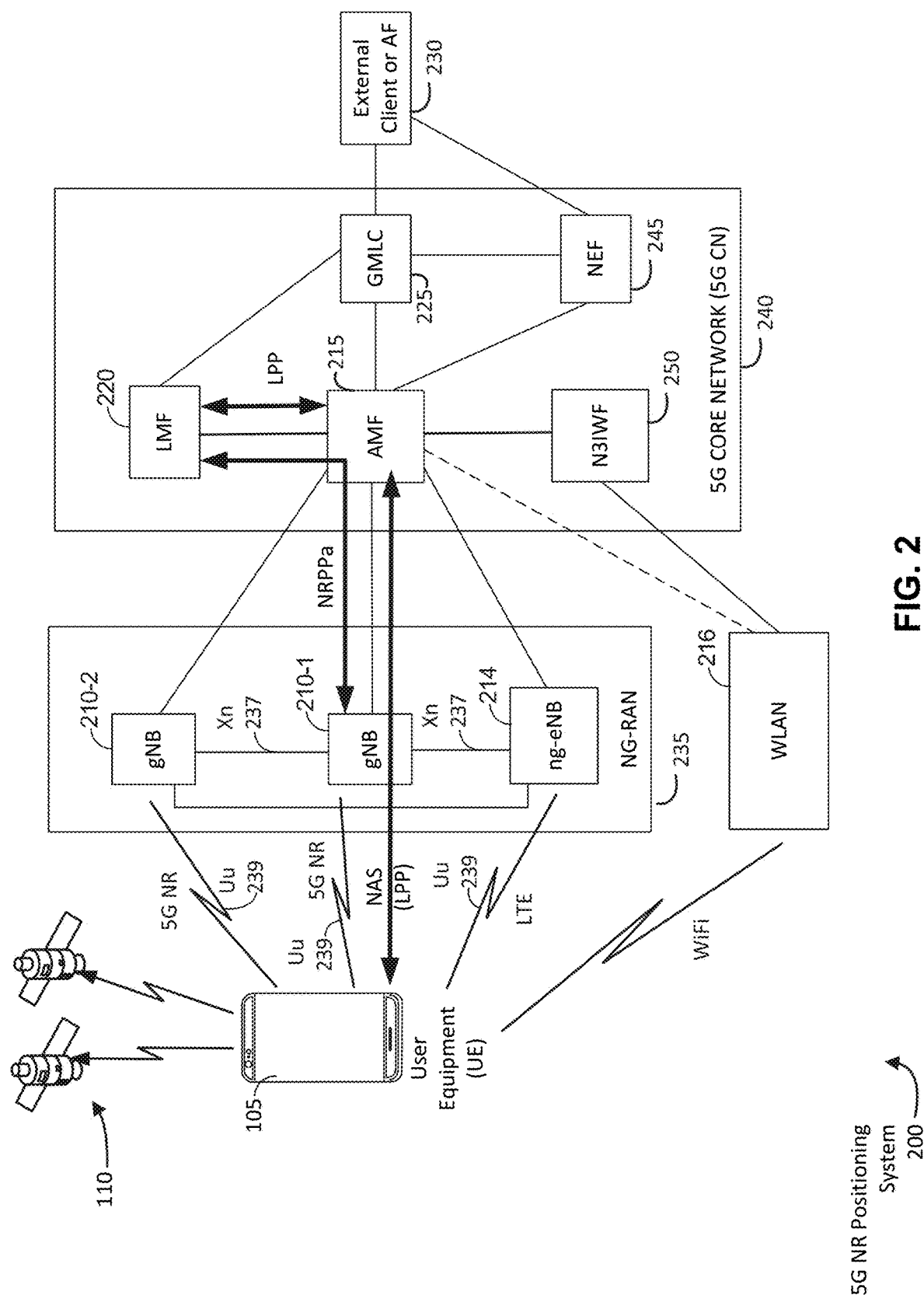
FIG. 2 is a diagram of a 5th Generation (5G) New Radio (NR) positioning system, illustrating an embodiment of a positioning system (e.g., as illustrated in FIG. 1) implementing 5G NR.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNB s 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AOA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AOA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AOA, Receive Time-Transmission Time Difference (Rx-Tx), Differential AOA (DAOA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNB s 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AOA.

Figure 3:
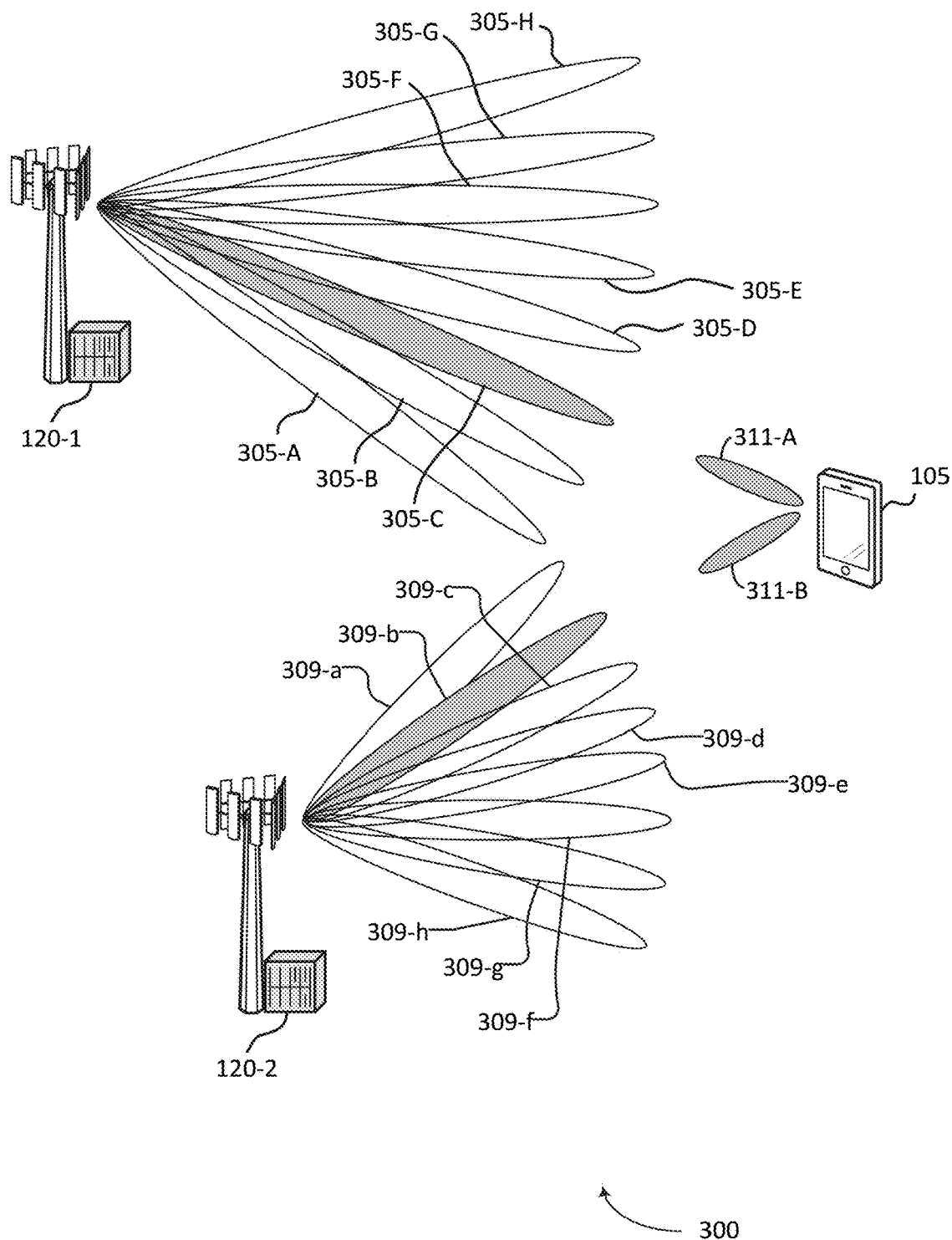
FIG. 3 is a diagram of a simplified environment including two base stations producing directional beams for transmitting radio frequency (RF) reference signals, and a UE.

FIG. 3 by way of example, illustrates a simplified environment 300 including two base stations 120-1 and 120-2 (which may correspond to base stations 120 of FIG. 1 and/or gNBs 210 and/or ng-eNB 214 of FIG. 2) producing directional beams for transmitting RF reference signals, and a UE 105. Each of the directional beams is rotated, e.g., through 120 or 360 degrees, for each beam sweep, which may be periodically repeated. Each direction beam can include an RF reference signal (e.g., a PRS resource), where base station 120-1 produces a set of RF reference signals that includes Tx beams 305-*a*, 305-*b*, 305-*c*, 305-*d*, 305-*e*, 305-*f*, 305-*g*, and 305-*h*, and the base station 120-2 produces a set of RF reference signals that includes Tx beams 309-*a*, 309-*b*, 309-*c*, 309-*d*, 309-*e*, 309-*f*, 309-*g*, and 309-*h*. Because UE 105 may also include an antenna array, it can receive RF reference signals transmitted by base stations 120-1 and 120-2 using beamforming to form respective receive beams (Rx beams) 311-*a* and 311-*b*.

The selection of beam 305-*c* from base station 120-1 can be from a receive-side beam sweeping operation in which UE 105 determines the RF reference signal (e.g., using reference signal receive power (RSRP)) is the highest (among all Tx beam 305 and Rx beam 311 combinations) for a beam pair comprising a Tx beam 305-*c* and Rx beam 311-*a*. A similar process can be used to determine beam pair 309-*b* and 311-*b*. In this manner the beam pairs illustrated with shading in FIG. 3 can be used for taking position-related measurements to determine the location of the UE 105.

Figure 4:
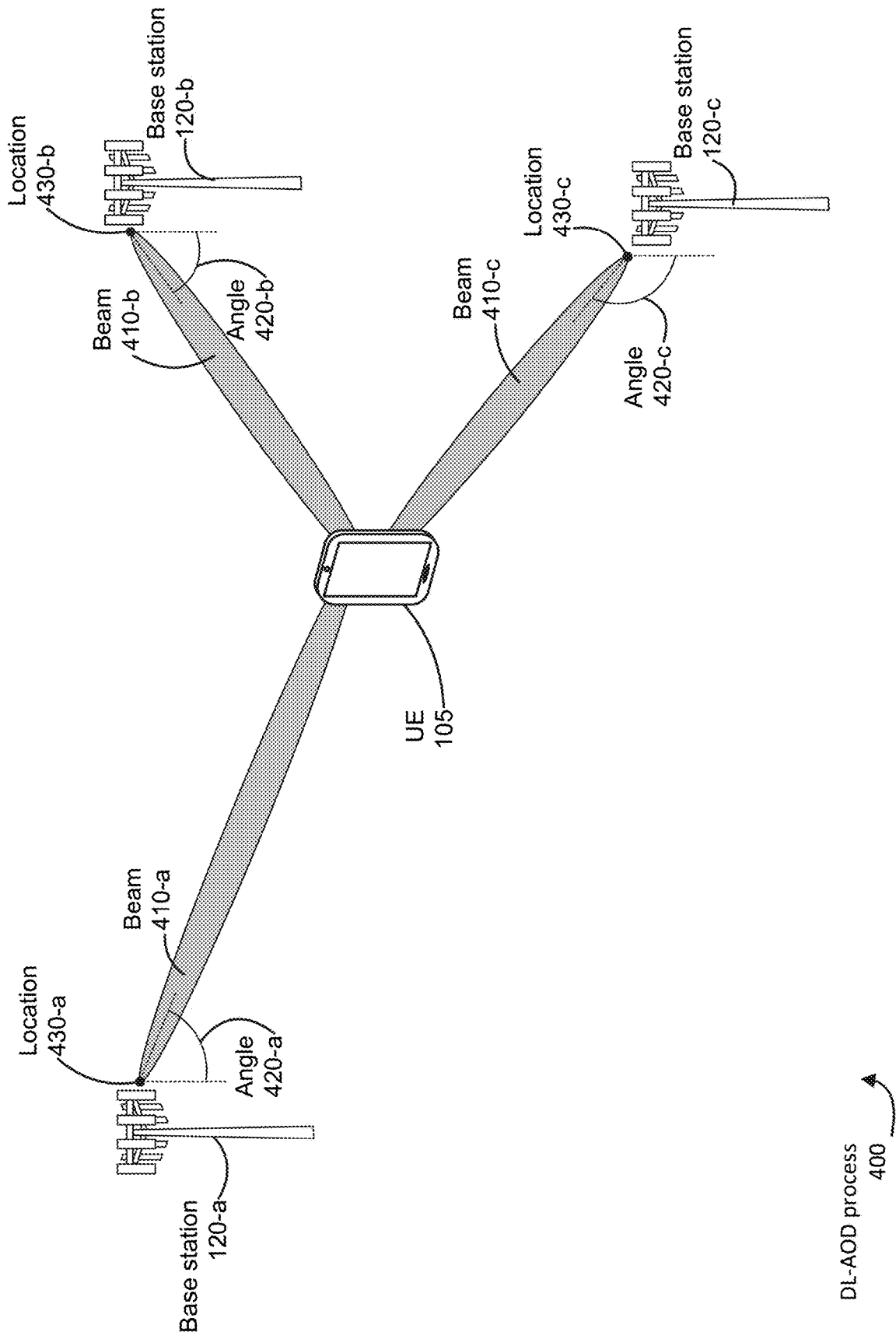
FIG. 4 is a graphical representation of an embodiment of a downlink (DL) Angle of Departure (AoD) (DL-AoD) measurement process, according to an embodiment.

FIG. 4 is a graphical representation of an embodiment of a downlink AoD (DL-AoD) measurement process 400 in which angular information provided by beams 410 can be used to determine the position of a UE 105. It can be noted, however, that embodiments for providing beam information (described in more detail below) are not limited to such processes. Other embodiments may include additional or alternative types of measurements and/or positioning processes. Measurements may, for example include, AoD and AoA, including elevation (vertical) angle of arrival (ZoA) and/or elevation angle of departure (ZoD).

In FIG. 4, base stations 120-*a*, 120-*b*, and 120-*c* transmitted respective RF reference signals using respective beams 410-*a*, 410-*b*, and 410-*c*. The UE 105, as noted, can make RSRP measurements of the respective RF reference signals, which can be used to determine respective DL-AoDs. In some embodiments, for example in network-based positioning, the UE 105 may communicate RSRP measurements to a location server to determine the DL-AoDs. In other embodiments, for example in UE-based positioning, the UE 105 may determine the DL-AoDs. The DL-AoDs (corresponding to angles 420-*a*, 420-*b*, and 420-*c*) may be with respect to a reference direction or plane. The DL-AoDs can then be used, together with base station locations 430-*a*, 430-*b*, and 430-*c* to triangulate the position of the UE 105. It can be noted, that in other instances or embodiments, a different number of base stations 120 may be used to determine the location of the UE 105. Moreover, in some embodiments, distance measurements may be used (e.g., a distance between the UE 105 and one or more base stations 120, as measured, for example, using RTT) in addition to DL-AoD information to calculate the position of the UE 105.

To determine a DL-AoD of an RF reference signal transmitted by a base station 120 at the UE, the UE may need to have additional information regarding the shape of a respective beam 410 with which the base station 120 transmitted the RF reference signal. Unlike the simplified beam shape illustrated in FIGS. 3 and 4, beam shapes can vary in amplitude and direction, and may have side lobes. Moreover, because RF reference signals in a wideband system may be communicated on a wide range of frequencies (e.g., 24-29 GHz) beams 410 may be subject to beam squint issues. Additional information regarding beam squint is shown in FIGS. 5A and 5B.

Figure 5A:
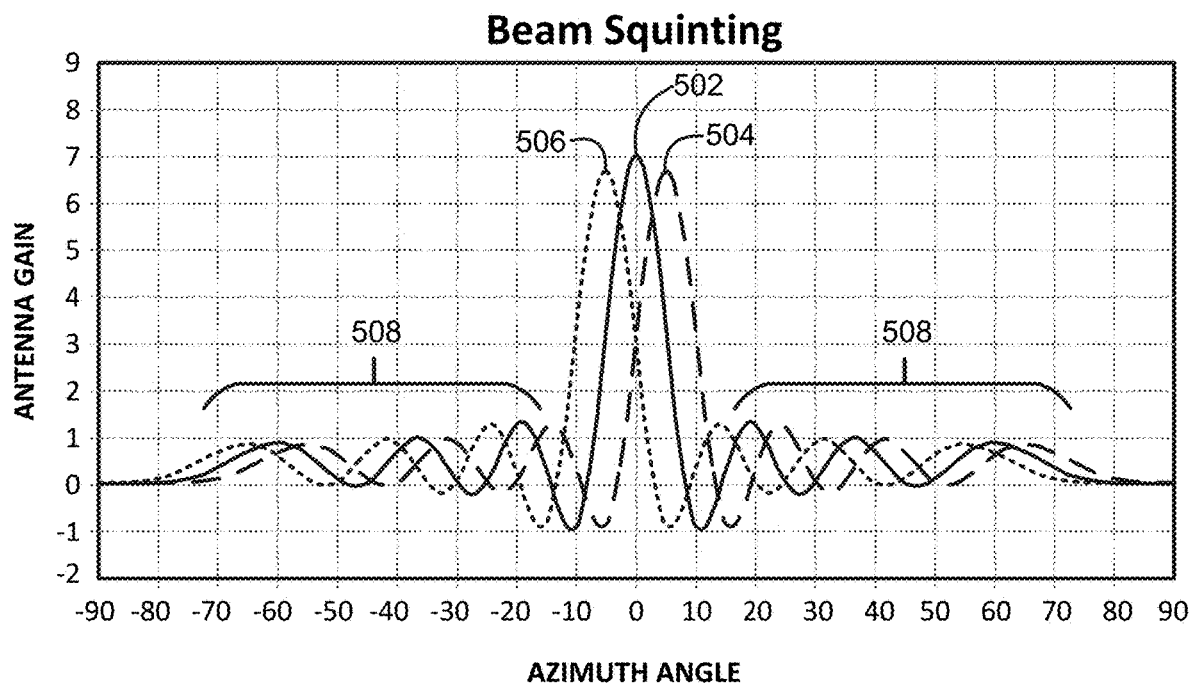
FIG. 5A is a graph charting antenna gain over azimuth angle, illustrating beam squint.
Figure 5B:
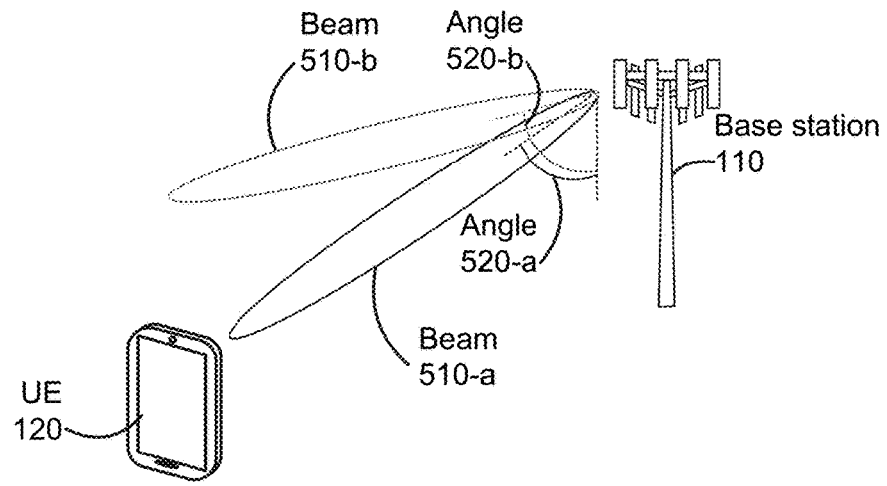
FIG. 5B is a diagram illustrating a setup in which a User Equipment (UE) may take measurements of RF reference signals transmitted by a base station to determine a DL-AoD for purposes of determining the position of the UE, according to an embodiment.

FIG. 5A is a graph charting antenna gain over azimuth angle. Here, a main lobe at azimuth angle zero represents the main lobe of a reference beam 502. The carrier frequency for this reference beam 502 is the carrier frequency to which the antenna array transmitting the beam 502 is tuned. That is, antenna elements in an antenna array are spaced (e.g., λ/2, where λ is wavelength) to accommodate the wavelength of a certain carrier frequency. Additionally, the codeword (phase offset and weight for each antenna element) is designed to accommodate the carrier frequency.

Gain and beam direction may be dependent on various factors such as frequency, polarization, and orientation. With the varying frequencies that wideband systems may use, beams may be subject to "beam squint" in which the beam azimuth (and/or elevation) angle and gain changes with the use of different frequencies. That is, the angle of the main lobe may shift, (e.g., increase or decrease, as shown by beam 504 and beam 506) depending on whether the frequency is higher or lower than the reference frequency of the reference beam 502. Similarly, the beamforming gain may vary from the beamforming gain in the boresight direction at reference frequency, based on a difference between the reference frequency and the carrier frequency used. This frequency dependence can be based on the particular physical characteristics and codeword used by the transmitting antenna array.

It can be noted here that the antenna gain plotted in the graph shown in FIG. 5A is simplified for illustrative purposes. In practical embodiments, the beam shape of the reference beam 502 and other beams 504, 506 may be more complex. Moreover, the beam shape of the other beams 504, 506 may vary (in addition to the angle) with frequency.

FIG. 5B illustrates a setup in which a UE 120 may take measurements of RF reference signals transmitted by a base station 110 to determine a DL-AoD for purposes of determining the position of the UE 120 (similar to the process illustrated in FIG. 4). FIG. 5B further illustrates how the angle of the respective beam of the RF reference signal may vary, depending on the frequency used to transmit the RF reference signal. That is, rather than transmitting an RF reference signal using a first Tx beam 510-*a* with a corresponding first angle 520-A, the base station 110 may send a second Tx beam 510-*b* at a second angle 520-*b*, where the difference between the first angle 520-*a* and second angle 520-*b* is due to beam squint.

Beam squint at the UE 120 may be more pronounced. That is, according to some embodiments, the UE may transmit an uplink (UL) RF reference signal for position determination in which a being used to transmit the RF reference signal is subject to beam squint. Unlike a base station 110, which may have multiple front ends (antenna arrays/panels and associated transmit circuitry) tuned to different frequencies within the wideband spectrum to help reduce beam squint, the UE 120 may have only a single front-end. As such, Tx beams for RF signals transmitted by the UE 120 may be more subject to beam squint across full spectrum. Further beam squint also may be a problem for Rx beam, as the space between elements and codebook also impact how the signal is received from certain direction.

To help ensure accurate measurements of RF reference signals, embodiments provided herein beam issues arising from beam squint (and other frequency-dependent effects on beam shape) by providing information regarding the beam shape of a Tx beam used in the transmission of an RF reference signal to a receiving device. As noted in FIGS. 4 and 5B, the transmission of the RF reference signal may be made by a base station (or, more specifically, a TRP) and the receiving device may be a UE 120. However, in alternative embodiments, the transmitting device may comprise a UE 120, in the receiving device may comprise a TRP. Additionally, in some embodiments, Rx beam information may be shared with a transmitting device.

The way in which beam shape information can be communicated to a receiving device can vary, depending on desired functionality. For example, for a given RF reference signal (PRS, CRS, CSI-RS, etc.) or set of RF reference signals, which may be used to determine angular information for position determination for the UE 120, a full beam shape for the Tx beam of the RF reference signal(s) may be provided. This can include, for example, gain in each azimuth and elevation direction for the Tx beam. The granularity of the azimuth and elevation directions may be dependent on the limitations of the accuracy of the measurements by the UE 120 and/or position determination for the UE 120. It can be noted, however, that providing full beam shape in this manner can take a large amount of overhead. If beams/codebooks change dynamically, beam shape may need to be communicated frequently.

Other options for communicating beam shape include communicating one or more of the following:

1. Boresight direction and beam width of a main lobe. Optionally, the information may include boresight direction and beam width of one or more side lobes. This can be provided on a per-antenna or per-beam basis. This may involve far less overhead than conveying the full beam shape, and may therefore be more conducive to frequent updates (e.g., where multiple RF reference signals are measured).
2. Antenna element pattern, codeword, and panel (antenna array) layout. The panel (antenna array) layout can include, for example, the arrangement of elements in different panels (e.g., using Cartesian or polar coordinates to describe element locations), the type of antenna elements (e.g., patch or dipole), and the like. The antenna element pattern may be descriptive of the radiation pattern of each antenna element. Together with the codeword, the antenna element pattern and antenna array layout can allow for a determination of the beam shape. In some embodiments, everything may be described in terms of lambda/N spacing, where the reference wavelength (lambda) is communicated. Patterns of antenna elements may be different in different panels. Although providing antenna element pattern and panel layout in this manner may require a large overhead, it is indicative of unchanging hardware way and therefore may not require much dynamic information. That said, dynamic information may include actual weight phases and/or amplitudes applied to elements to create the Tx beam. With the antenna element pattern and panel layout, as well as the dynamic information, the receiving device (e.g., UE 120) can then compute the full beam shape of the Tx beam.

3. An index identifier. In some embodiments, a receiving device may have a database of beam shape information for different types of transmitting devices locally stored (e.g., pre-loaded in memory). (Because there are a limited amount of antenna/RF front end manufacturers, there may be some beam shape information that is shared among multiple device types, which can save space requirements for storing beam shape information for different types of transmitting devices.) An index identifier—such as a number, word, code, device type, etc.—may be provided to the receiving device to enable the receiving device to look up the stored beam shape information for the Tx beam used to transmit the RF reference signal. This beam shape information may comprise any of the previous-mentioned information (e.g., full beam shape, boresight direction and beam width, antenna element pattern/panel layout, and the like).

4. One or more equations. Some beam shapes may be accurately approximated using one or more equations, which may take into account frequency dependence. As such, such equations may be communicated to a receiving device for determination of the beam shape of an RF reference signal.

5. Other embodiments may provide additional information to convey frequency dependence for beam shape. For example, according to some embodiments, a reference carrier frequency or bandwidth may be provided, which may be in addition to the boresight and/or beam width of the main lobe. In some embodiments, the information may also include number of sidelobes 508, and/or their relative strength, pointing direction, beam width, etc. In some embodiments, the boresight and beam width information may include information for the main lobe and one or more of the sidelobes (e.g., prominent sidelobes having an amplitude above a threshold).

As noted, some information may already convey frequency dependence (e.g., using equations). In some embodiments, multiple sets of information may be provided for multiple frequencies (e.g., a boresight and beam width for different frequencies.)

In some embodiments, beam shape information may be provided on a per frequency-layer basis to help convey beam shape frequency dependence. In some embodiments, the information may be provided on a per frequency-layer basis if bandwidth is less than a threshold value. Otherwise, bandwidth can be divided into sub-bands or bandwidth part (BWP), and beam shape information can be conveyed on a per sub-band/BWP basis.

To reduce the signaling overhead, a baseline or reference beam shape with full description at a reference frequency (e.g. beam forming gain at each angle) may be provided. Beam shape information for will describe the delta compared with the baseline beam shape. According to some embodiments, the baseline beam shape may comprise a predetermined beam shape that may be provided to or known by a receiving device. For example, the predetermined beam shape may comprise a beam shape defined by a relevant standard, or provided by a transmitting device or location server. For instances in which many RF reference signals are transmitted by a transmitting device, the transmitting device may provide a baseline beam shape that describes a beam used to transmit one RF reference signal (e.g., the first RF reference signal), then provide a difference or delta in beam shape for beams used to transmit other RF reference signals.

In some embodiments, group delay information may also be provided to a receiving device, where group delay may impact measurements of the RF reference signal taken by a receiving device. That is, group delay for RF reference signals may be frequency dependent in a manner similar to beam shapes. As such, this group delay information may also be provided to a receiving device, according to some embodiments. Because group delay may be specific to a particular RF front end or panel, group delay information may be provided for each RF front end or panel used to transmit RF reference signals. Moreover, similar to the options for conveying beam shape information, group delay may be provided in reference to a reference carrier frequency or bandwidth (using a differential indication to indicate frequency dependence). Alternatively, different group delays may simply be provided for different respective carrier frequencies.

According to some embodiments, beam shape information and/or group delay information may be provided to a receiving device using one or more different 5G NR signaling layers. For example, information may be conveyed using L1 (e.g., Downlink Control Information (DCI), Uplink Control Information (UCI), or Sidelink Control Information (SCI)), L2 (e.g., MAC Control Element (MAC-CE)), or L3 (e.g., Radio Resource Control (RRC) using LPP/NRPPa). Because of the different capabilities of different layers (e.g., speed at which information is conveyed, capabilities of conveying large amounts of information, etc.), the format of the information conveyed (e.g., full beam shape, boresight/bandwidth of main lobe, equations, index, etc.) may be chosen based on the different layers use.

Although changes in beam shape (beam squint) and group delay may take place for small variances in frequency with respect to a reference frequency, the small variances may not ultimately impact the accuracy of a position determination of a UE 120 based on measurements taken of RF reference signals. As such, embodiments may establish threshold frequencies at which beam shape and group delay may impact position determination accuracy. These threshold frequencies (which may be the same or different for beam shape and group delay) may be used to determine whether beam shape information or group delay information is to be conveyed to a receiving device.

Figure 6A:
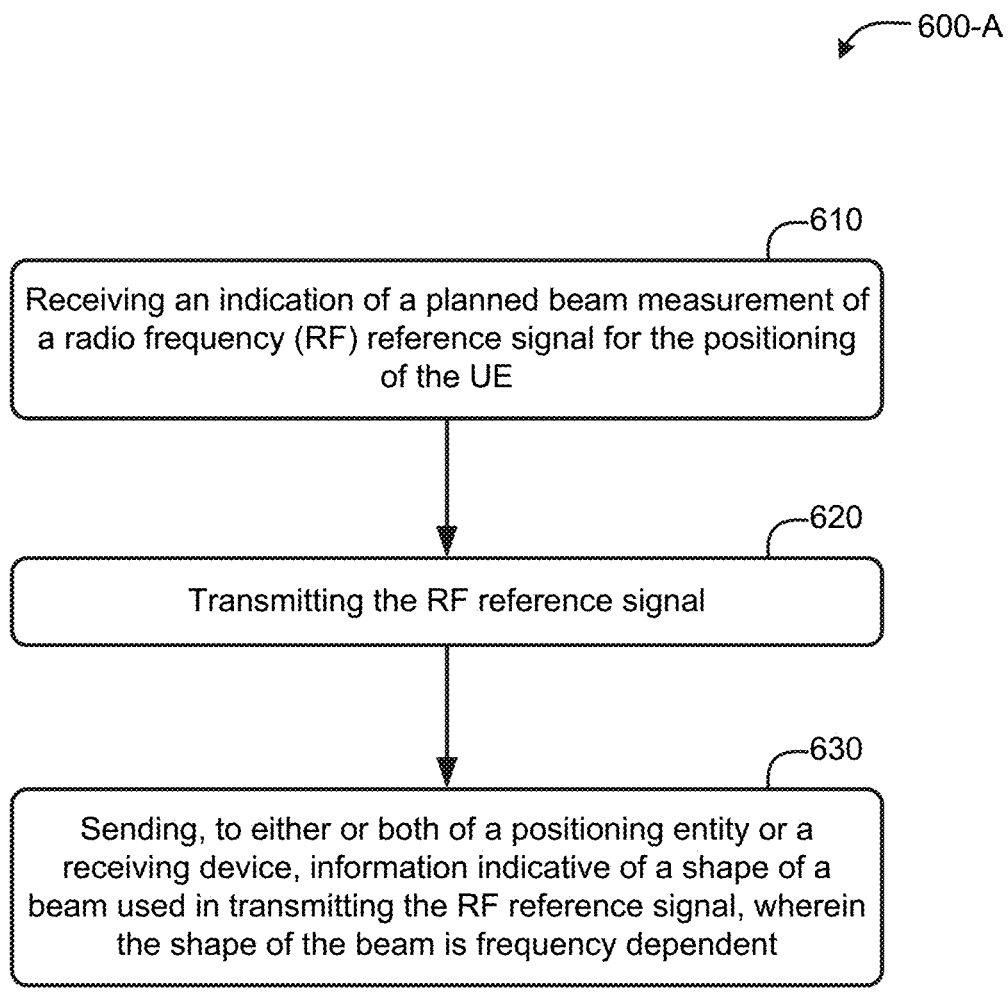
FIG. 6A is a flow diagram of method, at a transmitting device, of indicating beam-related information for positioning of a UE in a wireless wideband system, according to an embodiment.

FIG. 6A is a flow diagram of a method 600-A, at a transmitting device, for indicating beam-related information for positioning of a UE in a wireless wideband system, according to an embodiment. As noted in the embodiments above, a wideband system may refer to a system in which frequency dependence in shape of the beam can impact measurements of RF signals taken by a receiving device, which may be used for the determination of the position of a UE. Means for performing the functionality illustrated in the blocks shown in FIG. 6A may comprise hardware and/or software components of a UE or base station (TRP). Example components of a UE and base station are illustrated in FIGS. 7 and 8, which are described in more detail below.

At block 610, the functionality comprises receiving an indication of a planned beam measurement of an RF reference signal for the positioning of the UE. For example, a transmitting device (e.g. TRP or UE) may receive a notification or indication by a location server that a planned beam measurement of the RF reference signal is to be performed by a receiving device and/or a request from a location server or receiving device to provide information indicative of a shape of a beam of the RF reference signal to a receiving device and/or to a positioning entity that determines the location of the UE. According to some embodiments, the positioning entity may comprise the UE itself or the location server. D. According to some embodiments, the positioning entity may comprise a receiving device (e.g., a TRP or UE). In other embodiments, the positioning entity may comprise a location server or other device. According to some embodiments, the use of a beam in the transmission of the RF reference signal may be governed by one or more relevant wireless communication and/or position determination standards. As noted, depending on measurements taken, the transmitting device and receiving device may vary. In some instances, for example, the transmitting device may comprise a TRP and the receiving device may comprise a UE. In other instances, the transmitting device may comprise a UE and the receiving device may comprise a TRP. In some instances, such as in sidelink-based position determination, the transmitting device may comprise a first UE, and the receiving device may comprise a second UE. According to some embodiments, the planned beam measurement comprises an AoA or AoD measurement (which can include a ZoA or ZoD measurement). According to some embodiments, the functionality at block 610 may occur after transmitting the RF reference signal (at block 620). And thus, the indication in block 610 may be of a completed be measurement.

Figure 7:
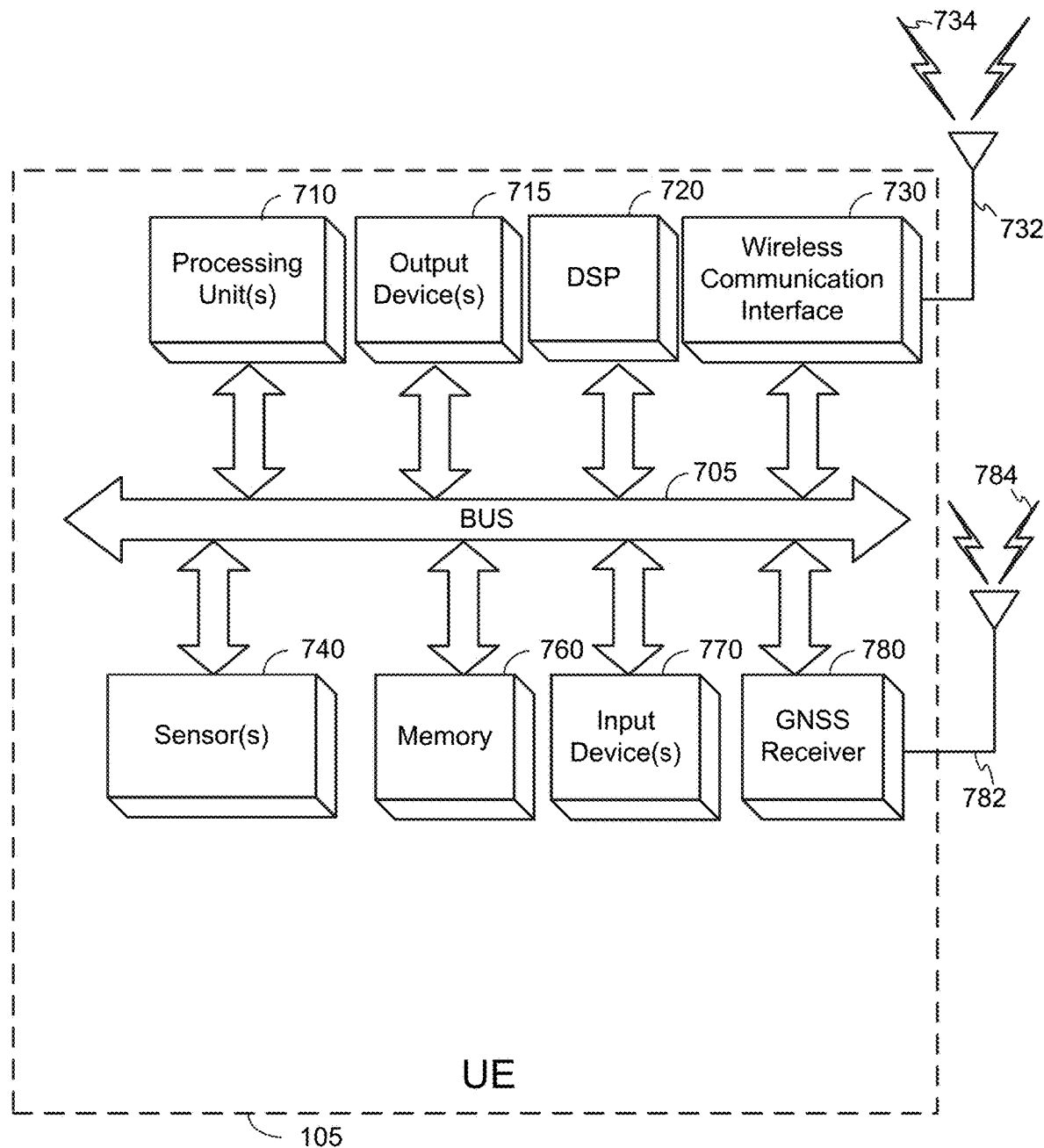
FIG. 7 is a block diagram of an embodiment of a UE, which can be utilized in embodiments as described herein.
Figure 8:
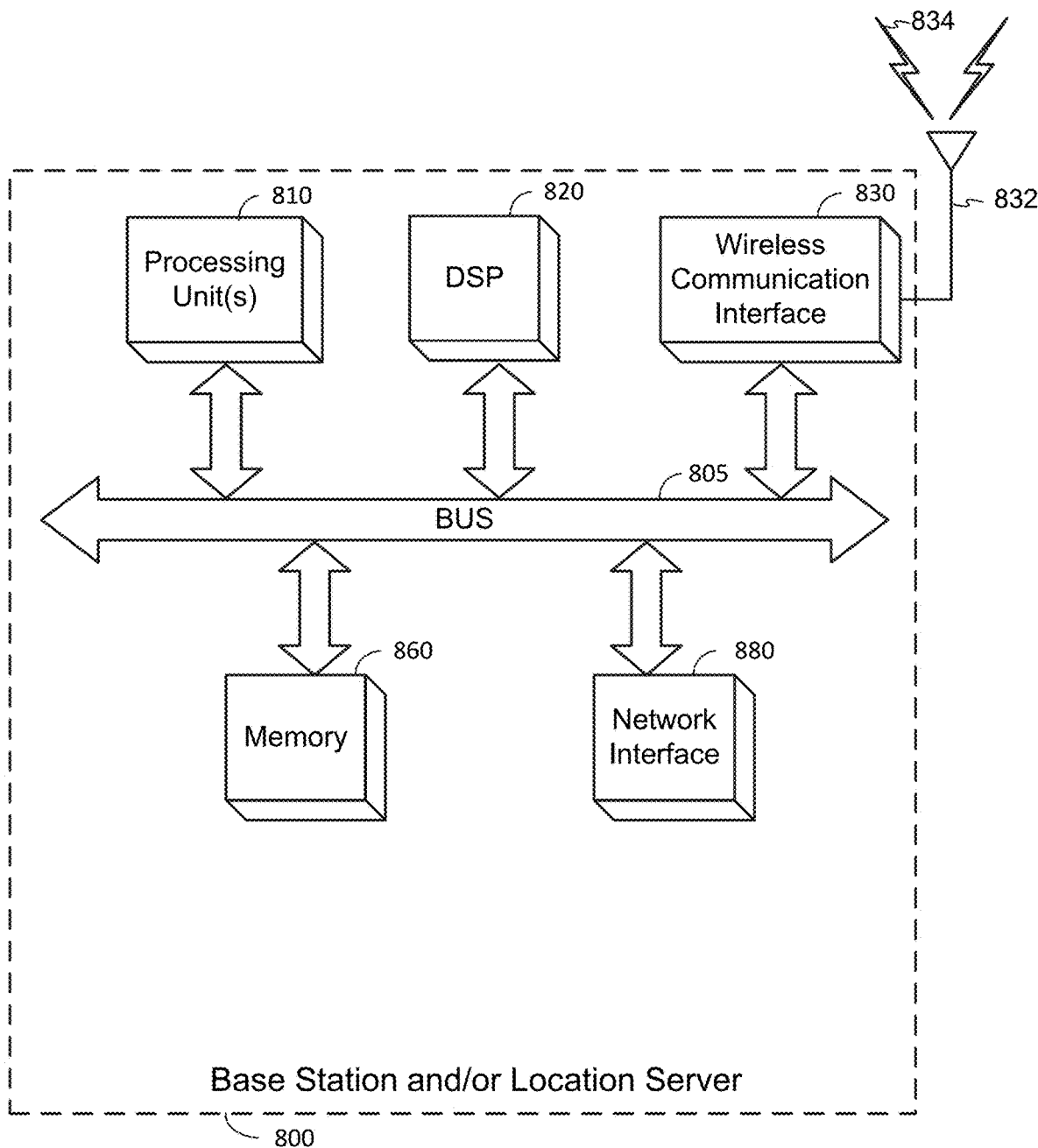
FIG. 8 is a block diagram of an embodiment of a base station, which can be utilized in embodiments as described herein.

Means for performing functionality at block 610 may comprise a wireless communication interface 730, processing unit(s) 710, and/or other components of a UE 105, as illustrated in FIG. 7. Alternatively, means for performing functionality at block 610 may comprise a wireless communication interface 830, processing unit(s) 810, and/or other components of a base station (TRP) 800, as illustrated in FIG. 8.

At block 620, the functionality comprises transmitting the RF reference signal. The transmitting may include the use of one or more beams, which may have one or more respective shapes. Additional details follow hereafter.

Means for performing functionality at block 620 may comprise a wireless communication interface 730, processing unit(s) 710, and/or other components of a UE 105, as illustrated in FIG. 7. Alternatively, means for performing functionality at block 610 may comprise a wireless communication interface 830, processing unit(s) 810, and/or other components of a base station 800, as illustrated in FIG. 8.

At block 630, the functionality comprises sending, to either or both of a positioning entity or a receiving device, information indicative of a shape of the beam used in transmitting of the RF reference signal, wherein the shape of the beam is frequency dependent. This functionality may vary, depending on the device type of the receiving device and/or whether the positioning entity comprises the receiving device. For example, in a UE-assisted approach a UE may measure RSRP values of multiple RF reference signals (e.g., multiple PRS resources in which each PRS resource is transmitted by a respective Tx beam by a TRP side). In this case, the UE may not need a beam shape, but instead the information indicative of the beam shape may be provided to a location server that receives the RSRP values from the UE. For instances in which a TRP is a receiving device, the receiving device may make angular measurements and may therefore utilize the information indicative of the beam shape.

As noted in the various embodiments described above, different types of information indicative of the shape of the beam may be used. For example, in some embodiments, the information indicative of the shape of the beam may gain of the beam in a plurality of azimuth and elevation directions, a boresight and width of a main lobe of the beam, a radiation pattern of antenna elements of an antenna panel used to transmit the beam, a shape of the beam for a reference frequency or bandwidth, or an identifier identifying information descriptive of the shape of the beam indexed at the receiving device, or a combination thereof. In some embodiments, the information indicative of the shape of the beam may further comprise a boresight, beamforming gain, and width of a main lobe of the beam and (optionally) a boresight and width of one or more sidelobes of the beam. In such embodiments, gain may also be provided for the main lobe and/or sidelobes. In some embodiments, the information indicative of the shape of the beam may further include information indicative of combining weights for the antenna elements used to transmit the beam. According to some embodiments in which the information indicative of the shape of the beam comprises the information indicative of the radiation pattern of the antenna elements of the antenna panel used to transmit the beam, the information indicative of the shape of the beam may further comprise information indicative of a geometry and layout of the antenna elements of the antenna panel. As noted, information can also include differential information, enabling the receiving device to determine changes in shape of the beam based on changes in frequency or bandwidth.

Means for performing functionality at block 630 may comprise a wireless communication interface 730, processing unit(s) 710, and/or other components of a UE 105, as illustrated in FIG. 7. Alternatively, means for performing functionality at block 610 may comprise a wireless communication interface 830, processing unit(s) 810, and/or other components of a base station 800, as illustrated in FIG. 8.

Additional functionality may be included in the method 600-A, according to some embodiments, as noted in the embodiments described above. For example, some embodiments of the method 600-A may further comprise determining a frequency dependence of a group delay in the transmission of the RF reference signal and sending, to either or both of the positioning entity or the receiving device, information indicative of the group delay. This frequency dependent may be provided in the form of differential indication to a reference frequency or bandwidth, using an equation, and/or providing the group delay for multiple carrier frequencies.

In some instances, the beam may be one of a plurality of beams used to transmit the RF reference signal. In such instances, some embodiments of the method 600-A may further comprise sending, to either or both of the positioning entity or the receiving device, information indicative of shape of the beam for each beam in the plurality of beams. Optionally, each beam in the plurality of beams corresponds to a respective frequency layer, bandwidth part (BWP), or configured contiguous blocks of frequency for the RF reference signal. In some embodiments, the method 600-A may further comprise determining a format for the information indicative of a shape of the beam. As noted, this format may be determined based on the layer in which information is provided. As such, for some embodiments of the method 600-A, the format is determined based, at least in part, on whether the information indicative of the shape of the beam is sent to the UE via L1, L2, or L3 signaling. As previously noted, beam shape may be conveyed with respect to a reference or baseline beam shape. As such, according to some embodiments, the information indicative of the shape of the beam may comprise information indicative of one or more differences between the shape of the beam used in the transmission of the RF reference signal and a reference beam shape.

As additionally noted, according to some embodiments, the information indicative of the shape of the beam comprises information indicative of one or more differences between the shape of the beam used in the transmission of the RF reference signal and a reference beam shape. Here, the reference beam shape may comprise a predetermined or known beam shape as defined in a relevant standard and/or provided to a receiving device beforehand. Additionally or alternatively, the reference beam shape may comprise the beam shape of one of many beam shapes used in transmitting the RF reference signal.

Figure 6B:
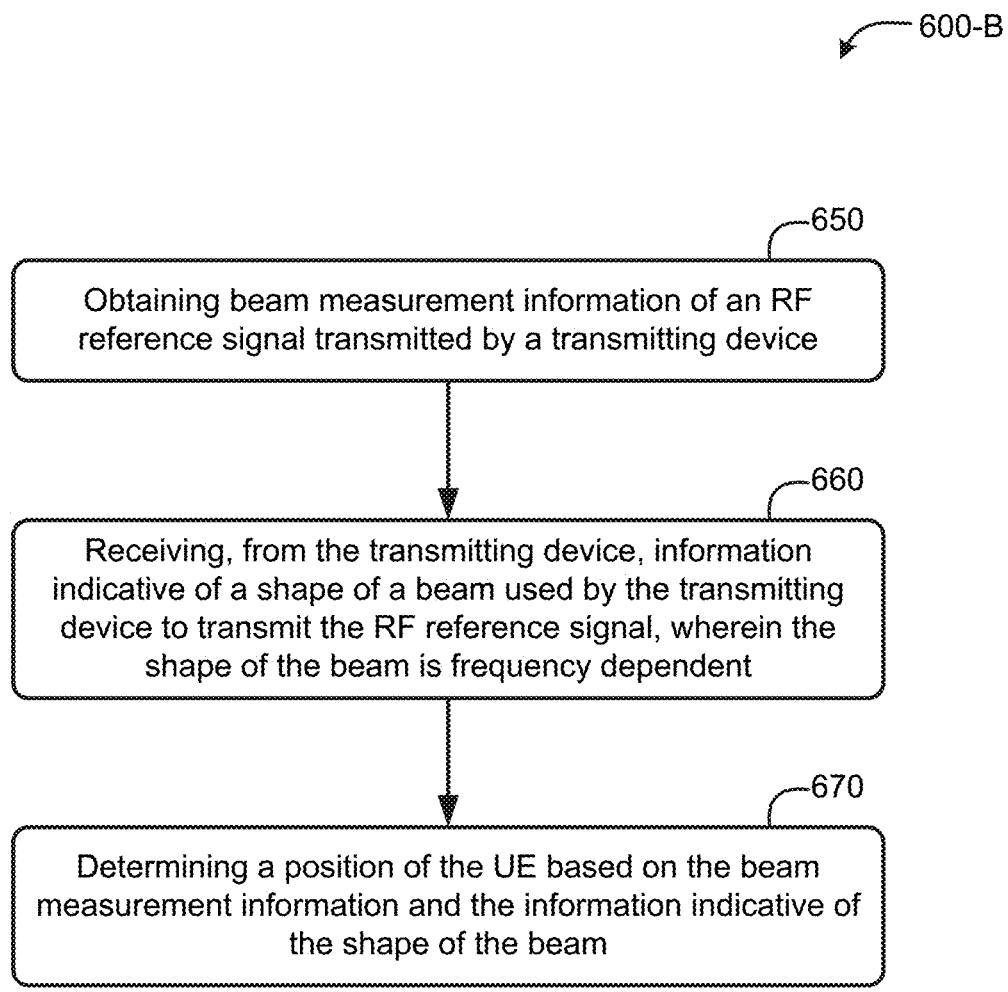
FIG. 6B is a flow diagram of a method, at a positioning entity, for positioning of a user equipment (UE) in a wireless wideband system, according to an embodiment.

FIG. 6B is a flow diagram of a method 600-B, at a positioning entity, for positioning of a user equipment (UE) in a wireless wideband system, according to an embodiment. Again, a wideband system may refer to a system in which frequency dependence in shape of the beam can impact measurements of RF signals taken by a receiving device, which may be used for the determination of the position of a UE. Means for performing the functionality illustrated in the blocks shown in FIG. 6B comprise hardware and/or software components of a UE or server (e.g., location server 160). Again, example components of a UE and base station are illustrated in FIGS. 7 and 8, which are described in more detail below.

At block 650, the functionality obtaining beam measurement information of an RF reference signal transmitted by a transmitting device. Beam measurement information may comprise, for example, RSRP measurement information or other AoD or AoA-related measurements, for example. More broadly, the beam measurement information may comprise information relating to an AoA or AoD measurement. For embodiments in which the positioning entity comprises the UE, obtaining beam measurement information may comprise performing a measurement of the RF reference signal at the UE. For embodiments in which the positioning entity comprises a server, obtaining beam measurement information may comprise receiving the beam measurement information at the server from the UE or TRP (e.g., the receiving device that makes the measurement). The transmitting device may comprise a TRP or a UE.

Means for performing functionality at block 650 may comprise a wireless communication interface 730, processing unit(s) 710, and/or other components of a UE 105, as illustrated in FIG. 7. Alternatively, means for performing functionality at block 650 may comprise a wireless communication interface 830, processing unit(s) 810, and/or other components of a location server 800, as illustrated in FIG. 8.

At block 660, the functionality comprises receiving, from the transmitting device, information indicative of a shape of a beam used by the transmitting device to transmit the RF reference signal, wherein the shape of the beam is frequency dependent. According to some embodiments, the information indicative of the shape of the beam comprises information indicative of gain of the beam in a plurality of azimuth and elevation directions, a boresight and width of a main lobe of the beam, a radiation pattern of antenna elements of an antenna panel used to transmit the beam, a shape of the beam for a reference frequency or bandwidth, or an identifier identifying information descriptive of the shape of the beam indexed at a receiving device, or a combination thereof. According to some embodiments the information indicative of the shape of the beam further comprises a boresight, beamforming gain, and width of one or more sidelobes of the beam. According to some embodiments the information indicative of the shape of the beam comprises the information indicative of the radiation pattern of the antenna elements of the antenna panel used to transmit the beam, and further comprises information indicative of combining weights for the antenna elements used to transmit the beam. According to some embodiments, the information indicative of the shape of the beam comprises the information indicative of the radiation pattern of the antenna elements of the antenna panel used to transmit the beam, and wherein the information indicative of the shape of the beam further comprises information indicative of a geometry and layout of the antenna elements of the antenna panel.

Means for performing functionality at block 660 may comprise a wireless communication interface 730, processing unit(s) 710, and/or other components of a UE 105, as illustrated in FIG. 7. Alternatively, means for performing functionality at block 660 may comprise a wireless communication interface 830, processing unit(s) 810, and/or other components of a location server 800, as illustrated in FIG. 8.

At block 670, the functionality comprises determining a position of the UE based on the beam measurement information and the information indicative of the shape of the beam. Here, determining the position of the UE may comprise modifying or correcting beam measurement information received at block 650 based on the information indicative of the shape of the beam received at block 660. Alternatively, the beam measurement information may be interpreted, weighted, and/or used differently based on the information indicative of the shape of the beam. Techniques may vary.

As noted in the various embodiments described above, embodiments may implement one or more additional features. For example, according to some embodiments, the method 600-B may further comprise receiving information indicative of a group delay in the transmission of the RF reference signal. Here, determining the position of the UE may be further based on the information indicative of the group delay. According to some embodiments, the beam may be one of a plurality of beams used to transmit the RF reference signal. In such embodiments, the method may further comprise receiving information indicative of shape of the beam for each beam in the plurality of beams. Optionally, each beam in the plurality of beams may correspond to a respective frequency layer, bandwidth part (BWP), or configured contiguous blocks of frequency for the RF reference signal. According to some embodiments, the information indicative of the shape of the beam comprises information indicative of one or more differences between the shape of the beam used in the transmission of the RF reference signal and a reference beam shape.

Means for performing functionality at block 670 may comprise a wireless communication interface 730, processing unit(s) 710, and/or other components of a UE 105, as illustrated in FIG. 7. Alternatively, means for performing functionality at block 670 may comprise a wireless communication interface 830, processing unit(s) 810, and/or other components of a base station 120, as illustrated in FIG. 8.

FIG. 7 illustrates an embodiment of a UE 105, which can be utilized as described herein above (e.g., in association with FIGS. 1-6). For example, the UE 105 can perform one or more of the functions of the methods shown in FIGS. 6 and 6B. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 7.

The UE 105 is shown comprising hardware elements that can be electrically coupled via a bus 705 (or may otherwise be in communication, as appropriate). The hardware elements may include a processing unit(s) 710 which can include without limitation one or more general-purpose processors, one or more special-purpose processors (such as digital signal processor (DSP) chips, graphics acceleration processors, application specific integrated circuits (ASICs), and/or the like), and/or other processing structures or means. As shown in FIG. 7, some embodiments may have a separate DSP 720, depending on desired functionality. Location determination and/or other determinations based on wireless communication may be provided in the processing unit(s) 710 and/or wireless communication interface 730 (discussed below). The UE 105 also can include one or more input devices 770, which can include without limitation one or more keyboards, touch screens, touch pads, microphones, buttons, dials, switches, and/or the like; and one or more output devices 715, which can include without limitation one or more displays (e.g., touch screens), light emitting diodes (LEDs), speakers, and/or the like.

The UE 105 may also include a wireless communication interface 730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 730 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 732 that send and/or receive wireless signals 734. According to some embodiments, the wireless communication antenna(s) 732 may comprise a plurality of discrete antennas, antenna arrays, or any combination thereof. The antenna(s) 732 may be capable of transmitting and receiving wireless signals using beams (e.g., Tx beams and Rx beams). Beam formation may be performed using digital and/or analog beam formation techniques, with respective digital and/or analog circuitry. The wireless communication interface 730 may include such circuitry.

Depending on desired functionality, the wireless communication interface 730 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 740. Sensor(s) 740 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 780 capable of receiving signals 784 from one or more GNSS satellites using an antenna 782 (which could be the same as antenna 732). Positioning based on GNSS signal measurement can be utilized to complement and/or incorporate the techniques described herein. The GNSS receiver 780 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 780 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 780 is illustrated in FIG. 7 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 710, DSP 720, and/or a processing unit within the wireless communication interface 730 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 710 or DSP 720.

The UE 105 may further include and/or be in communication with a memory 760. The memory 760 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 760 of the UE 105 also can comprise software elements (not shown in FIG. 7), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 760 that are executable by the UE 105 (and/or processing unit(s) 710 or DSP 720 within UE 105). In some embodiments, then, such code and/or instructions can be used to configure and/or adapt a general-purpose computer (or other device) to perform one or more operations in accordance with the described methods.

FIG. 8 illustrates an embodiment of a base station 120, which can be utilized as described herein above (e.g., in association with FIGS. 1-6). It should be noted that FIG. 8 is meant only to provide a generalized illustration of various components, any or all of which may be utilized as appropriate. In some embodiments, the base station 120 may correspond to a gNB, an ng-eNB, and/or (more generally) a TRP.

The base station 120 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as DSP chips, graphics acceleration processors, ASICs, and/or the like), and/or other processing structure or means. As shown in FIG. 8, some embodiments may have a separate DSP 820, depending on desired functionality. Location determination and/or other determinations based on wireless communication may be provided in the processing unit(s) 810 and/or wireless communication interface 830 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 830 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 832 that send and/or receive wireless signals 834.

The base station 120 may also include a network interface 880, which can include support of wireline communication technologies. The network interface 880 may include a modem, network card, chipset, and/or the like. The network interface 880 may include one or more input and/or output communication interfaces to permit data to be exchanged with a network, communication network servers, computer systems, and/or any other electronic devices described herein.

In many embodiments, the base station 120 may further comprise a memory 860. The memory 860 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 860 of the base station 120 also may comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the base station 120 (and/or processing unit(s) 810 or DSP 820 within base station 120). In some embodiments, then, such code and/or instructions can be used to configure and/or adapt a general-purpose computer (or other device) to perform one or more operations in accordance with the described methods. It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method, at a transmitting device, of indicating beam-related information for positioning of a user equipment (UE) in a wireless wideband system, the method comprising: receiving an indication of a planned beam measurement of a radio frequency (RF) reference signal for the positioning of the UE; transmitting the RF reference signal; and sending, to either or both of a positioning entity or a receiving device, information indicative of a shape of a beam used in transmitting the RF reference signal, wherein the shape of the beam is frequency dependent.

Clause 2. The method of clause 1, wherein the positioning entity comprises the receiving device.

Clause 3. The method of any of clauses 1-2 wherein the positioning entity comprises the UE, a Transmission Reception Point (TRP), or a location server.

Clause 4. The method of any of clauses 1-3 wherein the transmitting device comprises a TRP or a UE.

Clause 5. The method of any of clauses 1-4 wherein the planned beam measurement comprises an Angle of Arrival (AoA) or Angle of Departure (AoD) measurement.

Clause 6. The method of any of clauses 1-5 wherein the information indicative of the shape of the beam comprises information indicative of: gain of the beam in a plurality of azimuth and elevation directions, a boresight and width of a main lobe of the beam, a radiation pattern of antenna elements of an antenna panel used to transmit the beam, a shape of the beam for a reference frequency or bandwidth, or an identifier identifying information descriptive of the shape of the beam indexed at the receiving device, or a combination thereof.

Clause 7. The method clause 6 wherein the information indicative of the shape of the beam further comprises a boresight, beamforming gain, and width of one or more sidelobes of the beam.

Clause 8. The method of any of clauses 6-7 wherein the information indicative of the shape of the beam comprises the information indicative of the radiation pattern of the antenna elements of the antenna panel used to transmit the beam, and further comprises information indicative of combining weights for the antenna elements used to transmit the beam.

Clause 9. The method of any of clauses 6-8 wherein the information indicative of the shape of the beam comprises the information indicative of the radiation pattern of the antenna elements of the antenna panel used to transmit the beam, and wherein the information indicative of the shape of the beam further comprises information indicative of a geometry and layout of the antenna elements of the antenna panel.

Clause 10. The method of any of clauses 1-9 further comprising determining a frequency dependence of a group delay in the transmission of the RF reference signal; and sending, to either or both of the positioning entity or the receiving device, information indicative of the group delay.

Clause 11. The method of any of clauses 1-10 wherein the beam is one of a plurality of beams used to transmit the RF reference signal, and wherein the method further comprises sending, to either or both of the positioning entity or the receiving device, information indicative of shape of the beam for each beam in the plurality of beams.

Clause 12. The method of clause 11 wherein each beam in the plurality of beams corresponds to a respective frequency layer, bandwidth part (BWP), or configured contiguous blocks of frequency for the RF reference signal.

Clause 13. The method of any of clauses 11-12 further comprising determining a format for the information indicative of a shape of the beam based, at least in part, on whether the information indicative of the shape of the beam is sent to the UE via L1, L2, or L3 signaling.

Clause 14. The method of any of clauses 1-13 wherein the information indicative of the shape of the beam comprises information indicative of one or more differences between the shape of the beam used in the transmission of the RF reference signal and a reference beam shape.

Clause 15. A method, at a positioning entity, for positioning of a user equipment (UE) in a wireless wideband system, the method comprising: obtaining beam measurement information of a radio frequency (RF) reference signal transmitted by a transmitting device; receiving, from the transmitting device, information indicative of a shape of a beam used by the transmitting device to transmit the RF reference signal, wherein the shape of the beam is frequency dependent; and determining a position of the UE based on the beam measurement information and the information indicative of the shape of the beam.

Clause 16. The method of clause 15, wherein the positioning entity comprises the UE, and wherein obtaining beam measurement information comprises performing a measurement of the RF reference signal at the UE.

Clause 17. The method of any of clauses 15-16 wherein the positioning entity comprises a server, and wherein obtaining beam measurement information comprises receiving the beam measurement information at the server from the UE.

Clause 18. The method of any of clauses 15-17 wherein the transmitting device comprises a TRP or a UE.

Clause 19. The method of any of clauses 15-18 wherein the beam measurement information comprises information relating to an Angle of Arrival (AoA) or Angle of Departure (AoD) measurement.

Clause 20. The method of any of clauses 15-19 wherein the information indicative of the shape of the beam comprises information indicative of: gain of the beam in a plurality of azimuth and elevation directions, a boresight and width of a main lobe of the beam, a radiation pattern of antenna elements of an antenna panel used to transmit the beam, a shape of the beam for a reference frequency or bandwidth, or an identifier identifying information descriptive of the shape of the beam indexed at a receiving device, or a combination thereof.

Clause 21. The method of clause 20 wherein the information indicative of the shape of the beam further comprises a boresight, beamforming gain, and width of one or more sidelobes of the beam.

Clause 22. The method of any of clauses 20-21 wherein the information indicative of the shape of the beam comprises the information indicative of the radiation pattern of the antenna elements of the antenna panel used to transmit the beam, and further comprises information indicative of combining weights for the antenna elements used to transmit the beam.

Clause 23. The method of any of clauses 20-22 wherein the information indicative of the shape of the beam comprises the information indicative of the radiation pattern of the antenna elements of the antenna panel used to transmit the beam, and wherein the information indicative of the shape of the beam further comprises information indicative of a geometry and layout of the antenna elements of the antenna panel.

Clause 24. The method of any of clauses 20-23 further comprising receiving information indicative of a group delay in the transmission of the RF reference signal, wherein determining the position of the UE is further based on the information indicative of the group delay.

Clause 25. The method of any of clauses 15-24 wherein the beam is one of a plurality of beams used to transmit the RF reference signal, and wherein the method further comprises receiving information indicative of shape of the beam for each beam in the plurality of beams.

Clause 26. The method of clause 25 wherein each beam in the plurality of beams corresponds to a respective frequency layer, bandwidth part (BWP), or configured contiguous blocks of frequency for the RF reference signal.

Clause 27. The method of any of clauses 15-26 wherein the information indicative of the shape of the beam comprises information indicative of one or more differences between the shape of the beam used in the transmission of the RF reference signal and a reference beam shape.

Clause 28. A transmitting device for indicating beam-related information for positioning of a user equipment (UE) in a wireless wideband system, the transmitting device comprising: a transceiver; a memory; and one or more processors communicatively coupled with the transceiver and the memory, wherein the one or more processors are configured to: receive an indication of a planned beam measurement of a radio frequency (RF) reference signal for the positioning of the UE; transmit, via the transceiver, the RF reference signal; and send, to either or both of a positioning entity or a receiving device, information indicative of a shape of a beam used in transmitting the RF reference signal, wherein the shape of the beam is frequency dependent.

Clause 29. The transmitting device of clause 28, wherein the transmitting device comprises a TRP or a UE.

Clause 30. The transmitting device of any of clauses 28-29 wherein the one or more processors are configured to include, in the information indicative of the shape of the beam: gain of the beam in a plurality of azimuth and elevation directions, a boresight and width of a main lobe of the beam, a radiation pattern of antenna elements of an antenna panel used to transmit the beam, a shape of the beam for a reference frequency or bandwidth, or an identifier identifying information descriptive of the shape of the beam indexed at the receiving device, or a combination thereof.

Clause 31. The transmitting device of clause 30 wherein the one or more processors are configured to include, in the information indicative of the shape of the beam, a boresight, beamforming gain, and width of one or more sidelobes of the beam.

Clause 32. The transmitting device of any of clauses 30-31 wherein the one or more processors are configured to include, in the information indicative of the radiation pattern of the antenna elements of the antenna panel used to transmit the beam, information indicative of combining weights for the antenna elements used to transmit the beam.

Clause 33. The transmitting device of any of clauses 30-32 wherein the one or more processors are configured to include, in the information indicative of the radiation pattern of the antenna elements of the antenna panel used to transmit the beam, information indicative of a geometry and layout of the antenna elements of the antenna panel.

Clause 34. The transmitting device of any of clauses 28-33 wherein the one or more processors are further configured to: determine a frequency dependence of a group delay in the transmission of the RF reference signal; and send, to either or both of the positioning entity or the receiving device, information indicative of the group delay.

Clause 35. The transmitting device of any of clauses 28-34 wherein the beam is one of a plurality of beams used to transmit the RF reference signal, and wherein the one or more processors are further configured to send, to either or both of the positioning entity or the receiving device, information indicative of shape of the beam for each beam in the plurality of beams.

Clause 36. The transmitting device of clause 35 wherein each beam in the plurality of beams corresponds to a respective frequency layer, bandwidth part (BWP), or configured contiguous blocks of frequency for the RF reference signal.

Clause 37. The transmitting device of any of clauses 35-36 wherein the one or more processors are further configured to determine a format for the information indicative of a shape of the beam based, at least in part, on whether the information indicative of the shape of the beam is sent to the UE via L1, L2, or L3 signaling.

Clause 38. The transmitting device of any of clauses 28-37, wherein the one or more processors are configured to include, in the information indicative of the shape of the beam, information indicative of one or more differences between the shape of the beam used in the transmission of the RF reference signal and a reference beam shape.

Clause 39. A positioning entity for positioning of a user equipment (UE) in a wireless wideband system, the positioning entity comprising: a transceiver; a memory; and one or more processors communicatively coupled with the transceiver and the memory, wherein the one or more processors are configured to: obtain beam measurement information of a radio frequency (RF) reference signal transmitted by a transmitting device; receive, from the transmitting device via the transceiver, information indicative of a shape of a beam used by the transmitting device to transmit the RF reference signal, wherein the shape of the beam is frequency dependent; and determine a position of the UE based on the beam measurement information and the information indicative of the shape of the beam.

Clause 40. The positioning entity of clause 39, wherein the positioning entity comprises the UE, and wherein, to obtain beam measurement information, the one or more processors are configured to perform a measurement of the RF reference signal.

Clause 41. The positioning entity of any of clauses 39-40 wherein the positioning entity comprises a server, and wherein, to obtain beam measurement information, the one or more processors are configured to receive the beam measurement information from the UE.

Clause 42. The positioning entity of any of clauses 39-41 wherein the transmitting device comprises a TRP or a UE.

Clause 43. The positioning entity of any of clauses 39-42 wherein, to obtain the beam measurement information, the one or more processors are configured to obtain information relating to an Angle of Arrival (AoA) or Angle of Departure (AoD) measurement.

Clause 44. The positioning entity of any of clauses 39-43 wherein, to receive the information indicative of the shape of the beam, the one or more processors are configured to receive information indicative of gain of the beam in a plurality of azimuth and elevation directions, a boresight and width of a main lobe of the beam, a radiation pattern of antenna elements of an antenna panel used to transmit the beam, a shape of the beam for a reference frequency or bandwidth, or an identifier identifying information descriptive of the shape of the beam indexed at a receiving device, or a combination thereof.

Clause 45. The positioning entity of clause 44 wherein, to receive the information indicative of the shape of the beam, the one or more processors are configured to receive information indicative of a boresight, beamforming gain, and width of one or more sidelobes of the beam.

Clause 46. The positioning entity of any of clauses 44-45 wherein the one or more processors are configured to receive information indicative of combining weights for the antenna elements used to transmit the beam.

Clause 47. The positioning entity of any of clauses 44-46 wherein the one or more processors are configured to receive information indicative of information indicative of a geometry and layout of the antenna elements of the antenna panel.

Clause 48. The positioning entity of any of clauses 44-47 wherein the one or more processors are further configured to receive information indicative of a group delay in the transmission of the RF reference signal, wherein determining the position of the UE is further based on the information indicative of the group delay.

Clause 49. The positioning entity of any of clauses 39-48 wherein the beam is one of a plurality of beams used to transmit the RF reference signal, and wherein the one or more processors are further configured to receive information indicative of shape of the beam for each beam in the plurality of beams.

Clause 50. The positioning entity of clause 49 wherein each beam in the plurality of beams corresponds to a respective frequency layer, bandwidth part (BWP), or configured contiguous blocks of frequency for the RF reference signal.

Clause 51. The positioning entity of any of clauses 39-50 wherein, to receive the information indicative of the shape of the beam, the one or more processors are configured to receive information indicative of one or more differences between the shape of the beam used in the transmission of the RF reference signal and a reference beam shape.

Clause 52. An apparatus for indicating beam-related information for positioning of a user equipment (UE) in a wireless wideband system, the apparatus comprising: means for receiving an indication of a planned beam measurement of a radio frequency (RF) reference signal for the positioning of the UE; means for transmitting the RF reference signal; and means for sending, to either or both of a positioning entity or a receiving device, information indicative of a shape of a beam used in transmitting the RF reference signal, wherein the shape of the beam is frequency dependent.

Clause 53. The apparatus of clause 52, wherein the planned beam measurement comprises an Angle of Arrival (AoA) or Angle of Departure (AoD) measurement.

Clause 54. An apparatus for positioning of a user equipment (UE) in a wireless wideband system, the apparatus comprising: means for obtaining beam measurement information of a radio frequency (RF) reference signal transmitted by a transmitting device; means for receiving, from the transmitting device, information indicative of a shape of a beam used by the transmitting device to transmit the RF reference signal, wherein the shape of the beam is frequency dependent; and means for determining a position of the UE based on the beam measurement information and the information indicative of the shape of the beam.

Clause 55. The apparatus of clause 54, wherein the beam measurement information comprises information relating to an Angle of Arrival (AoA) or Angle of Departure (AoD) measurement.

Clause 56. A non-transitory computer-readable medium storing instructions for indicating beam-related information for positioning of a user equipment (UE) in a wireless wideband system, the instructions comprising code for: receiving an indication of a planned beam measurement of a radio frequency (RF) reference signal for the positioning of the UE; transmitting the RF reference signal; and sending, to either or both of a positioning entity or a receiving device, information indicative of a shape of a beam used in transmitting the RF reference signal, wherein the shape of the beam is frequency dependent.

Clause 57. A non-transitory computer-readable medium storing instructions for positioning of a user equipment (UE) in a wireless wideband system, the instructions comprising code for: obtaining beam measurement information of a radio frequency (RF) reference signal transmitted by a transmitting device; receiving, from the transmitting device, information indicative of a shape of a beam used by the transmitting device to transmit the RF reference signal, wherein the shape of the beam is frequency dependent; and determining a position of the UE based on the beam measurement information and the information indicative of the shape of the beam.

What is claimed is:

1. A method, at a positioning entity, for positioning of a user equipment (UE) in a wireless wideband system, the method comprising:
   obtaining beam measurement information of a radio frequency (RF) reference signal transmitted by a transmitting device;
   receiving, from the transmitting device, information indicative of a shape of a beam used by the transmitting device to transmit the RF reference signal, wherein the shape of the beam is frequency dependent, wherein the information indicative of the shape of the beam comprises information indicative of (i) a radiation pattern of antenna elements of an antenna panel used to transmit the beam, (ii) geometry and layout of the antenna elements; and
   determining a position of the UE based on the beam measurement information and the information indicative of the shape of the beam.

2. The method of claim 1, wherein the positioning entity comprises the UE, and wherein obtaining beam measurement information comprises performing a measurement of the RF reference signal at the UE.

3. The method of claim 1, wherein the positioning entity comprises a server, and wherein obtaining beam measurement information comprises receiving the beam measurement information at the server from the UE.

4. The method of claim 1, wherein the transmitting device comprises a TRP or a UE.

5. The method of claim 1, wherein the beam measurement information comprises information relating to an Angle of Arrival (AoA) or Angle of Departure (AoD) measurement.

6. The method of claim 1, wherein the information indicative of the shape of the beam comprises information indicative of:
   gain of the beam in a plurality of azimuth and elevation directions,
   a boresight and width of a main lobe of the beam,
   a shape of the beam for a reference frequency or bandwidth, or
   an identifier identifying information descriptive of the shape of the beam indexed at a receiving device, or
   a combination thereof.

7. The method of claim 6, wherein the information indicative of the shape of the beam further comprises a boresight, beamforming gain, and width of one or more sidelobes of the beam.

8. The method of claim 6, wherein the information indicative of the shape of the beam comprises the information indicative of the radiation pattern of the antenna elements of the antenna panel used to transmit the beam, and further comprises information indicative of combining weights for the antenna elements used to transmit the beam.

9. The method of claim 1, further comprising receiving information indicative of a group delay in the transmission of the RF reference signal, wherein determining the position of the UE is further based on the information indicative of the group delay.

10. The method of claim 1, wherein the beam is one of a plurality of beams used to transmit the RF reference signal, and wherein the method further comprises receiving information indicative of shape of the beam for each beam in the plurality of beams.

11. The method of claim 10, wherein each beam in the plurality of beams corresponds to a respective frequency layer, bandwidth part (BWP), or configured contiguous blocks of frequency for the RF reference signal.

12. The method of claim 1, wherein the information indicative of the shape of the beam comprises information indicative of one or more differences between the shape of the beam used in the transmission of the RF reference signal and a reference beam shape.

13. A positioning entity for positioning of a user equipment (UE) in a wireless wideband system, the positioning entity comprising:
   a transceiver;
   a memory; and
   one or more processors communicatively coupled with the transceiver and the memory, wherein the one or more processors are configured to:
      obtain beam measurement information of a radio frequency (RF) reference signal transmitted by a transmitting device;
      receive, from the transmitting device via the transceiver, information indicative of a shape of a beam used by the transmitting device to transmit the RF reference signal, wherein the shape of the beam is frequency dependent, wherein the information indicative of the shape of the beam comprises information indicative of (i) a radiation pattern of antenna elements of an antenna panel used to transmit the beam, (ii) geometry and layout of the antenna elements; and
      determine a position of the UE based on the beam measurement information and the information indicative of the shape of the beam.

14. The positioning entity of claim 13, wherein the positioning entity comprises the UE, and wherein, to obtain beam measurement information, the one or more processors are configured to perform a measurement of the RF reference signal.

15. The positioning entity of claim 13, wherein the positioning entity comprises a server, and wherein, to obtain beam measurement information, the one or more processors are configured to receive the beam measurement information from the UE.

16. The positioning entity of claim 13, wherein the transmitting device comprises a TRP or a UE.

17. The positioning entity of claim 13, wherein, to obtain the beam measurement information, the one or more processors are configured to obtain information relating to an Angle of Arrival (AoA) or Angle of Departure (AoD) measurement.

18. The positioning entity of claim 13, wherein, to receive the information indicative of the shape of the beam, the one or more processors are configured to receive information indicative of:
   gain of the beam in a plurality of azimuth and elevation directions,
   a boresight and width of a main lobe of the beam,
   a shape of the beam for a reference frequency or bandwidth, or
   an identifier identifying information descriptive of the shape of the beam indexed at a receiving device, or
   a combination thereof.

19. The positioning entity of claim 18, wherein, to receive the information indicative of the shape of the beam, the one or more processors are configured to receive information indicative of a boresight, beamforming gain, and width of one or more sidelobes of the beam.

20. The positioning entity of claim 18, wherein the one or more processors are configured to receive information indicative of combining weights for the antenna elements used to transmit the beam.

21. The positioning entity of claim 13, wherein the one or more processors are further configured to receive information indicative of a group delay in the transmission of the RF reference signal, wherein determining the position of the UE is further based on the information indicative of the group delay.

22. The positioning entity of claim 13, wherein the beam is one of a plurality of beams used to transmit the RF reference signal, and wherein the one or more processors are further configured to receive information indicative of shape of the beam for each beam in the plurality of beams.

23. The positioning entity of claim 22, wherein each beam in the plurality of beams corresponds to a respective frequency layer, bandwidth part (BWP), or configured contiguous blocks of frequency for the RF reference signal.

24. The positioning entity of claim 13, wherein, to receive the information indicative of the shape of the beam, the one or more processors are configured to receive information indicative of one or more differences between the shape of the beam used in the transmission of the RF reference signal and a reference beam shape.

25. An apparatus for positioning of a user equipment (UE) in a wireless wideband system, the apparatus comprising:
   means for obtaining beam measurement information of a radio frequency (RF) reference signal transmitted by a transmitting device;
   means for receiving, from the transmitting device, information indicative of a shape of a beam used by the transmitting device to transmit the RF reference signal, wherein the shape of the beam is frequency dependent, wherein the information indicative of the shape of the beam comprises one or more differences between the shape of the beam used in the transmission of the RF reference signal and a reference beam shape; and
   means for determining a position of the UE based on the beam measurement information and the information indicative of the shape of the beam.

26. The apparatus of claim 25, wherein the beam measurement information comprises information relating to an Angle of Arrival (AoA) or Angle of Departure (AoD) measurement.

27. A non-transitory computer-readable medium storing instructions for positioning of a user equipment (UE) in a wireless wideband system, the instructions comprising code for:
   obtaining beam measurement information of a radio frequency (RF) reference signal transmitted by a transmitting device;
   receiving, from the transmitting device, information indicative of a shape of a beam used by the transmitting device to transmit the RF reference signal, wherein the shape of the beam is frequency dependent, wherein the information indicative of the shape of the beam comprises information indicative of one or more differences between the shape of the beam used in the transmission of the RF reference signal and a reference beam shape; and
   determining a position of the UE based on the beam measurement information and the information indicative of the shape of the beam.

* * * * *